United States Patent [19]

Camden, Jr.

[11] Patent Number: 4,631,166

[45] Date of Patent: Dec. 23, 1986

[54] HIGH UTILIZATION FUEL ASSEMBLY

[75] Inventor: Thomas M. Camden, Jr., Apollo, Pa.

[73] Assignee: Westinghouse Electric Corp., Pittsburgh, Pa.

[21] Appl. No.: 609,251

[22] Filed: May 11, 1984

[51] Int. Cl.$^4$ .............................................. G21C 3/32
[52] U.S. Cl. ................................. 376/435; 376/267; 376/420; 376/445
[58] Field of Search ................ 376/420, 435, 445, 267

[56] References Cited

U.S. PATENT DOCUMENTS

| | | | |
|---|---|---|---|
| 3,425,908 | 2/1969 | Rouge | 376/434 |
| 4,326,922 | 4/1982 | Ferrari | 376/435 |
| 4,483,818 | 11/1984 | Yamashita | 376/435 |

*Primary Examiner*—Donald P. Walsh

[57] ABSTRACT

A nuclear fuel assembly for high utilization of the nuclear fuel is disclosed. Alternate fuel rod assemblies are axially shifted relative to each other to create zones of high hydrogen-to-uranium ratios at the ends of the core for high utilization of the fuel at the core ends. Each fuel rod assembly comprises separate upper and lower fuel rods. The axial shift provides intermeshing of the separation between axially aligned fuel rods at the core center. Seed blankets are located at the ends of the core and lower enriched sections are located at the core center during beginning of core life. After a specified amount of fuel depletion from reactor operation, the upper and lower rods are interchanged and an opposite axial shift is employed. The high utilization fuel assembly provides for burnup gradient utilization, axial blanket utilization, plutonium production and burnup, axial power flattening, and less use of enriched uranium.

12 Claims, 5 Drawing Figures

SYMBOL KEY

⊙ AXIALLY SHIFTED UP

⊕ AXIALLY SHIFTED DOWN

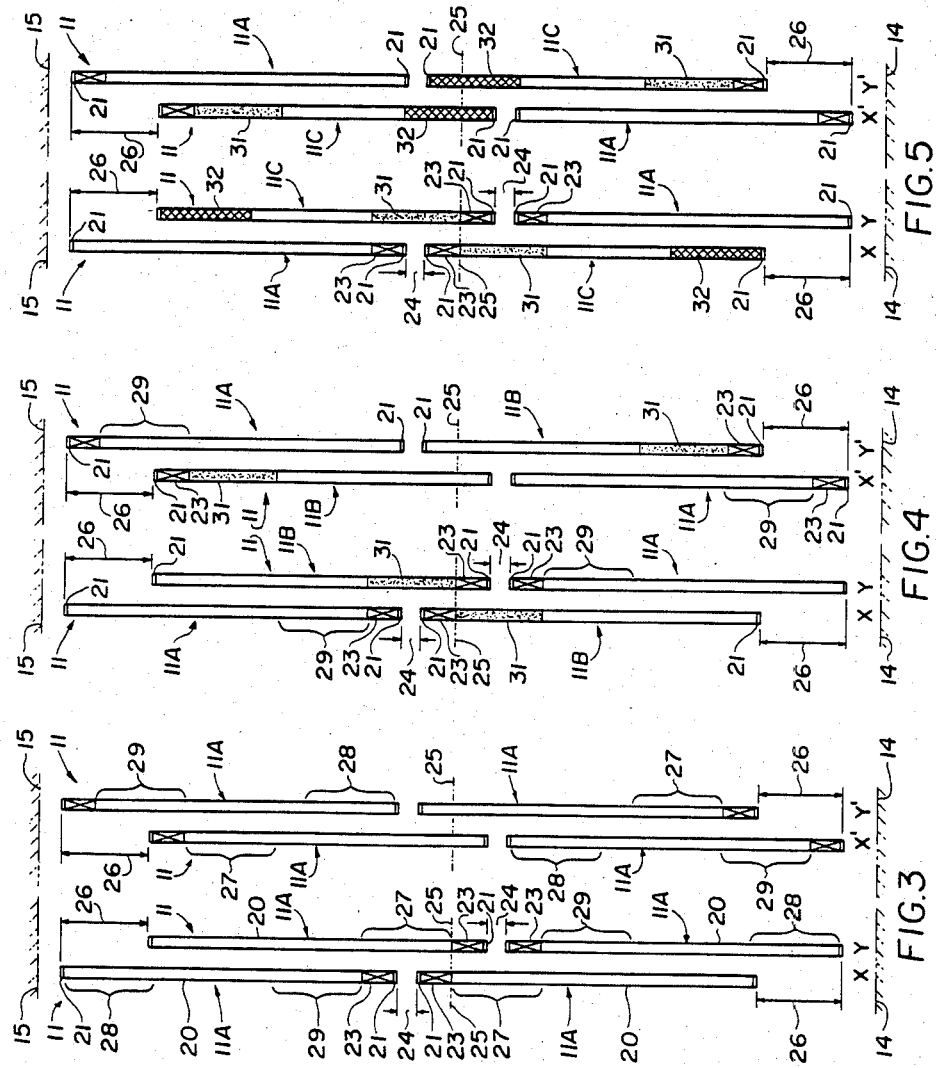

HIGH UTILIZATION FUEL ASSEMBLY

BACKGROUND OF THE INVENTION

1. Field of the Invention

This invention relates in general to the field of pressurized light water nuclear reactors and in particular to the fuel assemblies of such nuclear reactors and particularly those intended for commercial use.

2. Description of the Prior Art

It is well known that commercial pressurized light water nuclear reactors are both a technical and commercial success. In very simple and generalized terms, pressurized water nuclear reactors include independent primary and secondary flow systems. The primary system is usually a closed system using light water as the reactor coolant and the nuclear moderating fluid. The light water which is pressurized to prevent boiling, is heated upon flowing through a nuclear core which is contained within a pressure vessel. The heated reactor coolant upon leaving the pressure is ducted through a steam generator where it transfers the heat acquired from the nuclear core to another fluid within the secondary system. The cooled reactor coolant then flows back into the pressure vessel to be reheated to continue the cycle. The fluid within the secondary system, most often, is also light water, which is converted into steam within the steam generator. The steam is then used to generate electricity by large commercial steam turbine-electrical generator combinations.

The nuclear core is housed by and structurally supported within the pressure vessel. The pressure vessel also includes apparatus which ducts the primary reactor coolant from inlet nozzles attached to the pressure vessel, through the nuclear core and then out of the pressure vessel through outlet nozzles.

The nuclear core in reactors of the prior art to which the present invention applies, comprises a plurality of elongated fuel assemblies stacked side-by-side against each to form an irregular but approximately round cylindrical configuration. Each fuel assembly includes an inlet nozzle, an outlet nozzle and a square array of elongated nuclear fuel rods separated from each other and structurally supported by a number of grids spaced along the axial length of the elongated fuel rods. The inlet and outlet nozzles are not connected to the nuclear fuel rods. Rather, they are connected to respective ends of elongated guide tubes which are interspersed among the fuel rods. The guide tubes comprise hollow tubes which are usually larger in diameter than the diameter of the fuel rods. The fuel rods are, of course, positioned between the inlet and outlet nozzles. The primary coolant enters the fuel assembly through the inlet nozzle, flows past the fuel rods, and out the outlet nozzle.

The guide tubes interspersed among the fuel rods provide a guidance means by which control rods may be inserted within some of the fuel assemblies. The control rods are used to control the fission process of the nuclear core so that a sustained nuclear reactor is maintained. Typically, the fuel rods are loaded with enriched uranium. Absorber rods which also fit within the guide tubes in other fuel assemblies are used to absorb the excess neutrons produced by the enriched uranium. As the amount of enrichment decreases, from being burned during reactor operation, the absorber rods are withdrawn to compensate for the decrease in enrichment. Enrichment, although very expensive, is used to provide a means whereby the life of the core is extended in order to maximize the time between refueling of the core. Refueling requires shutdown of the reactor which is not only time consuming but also comprises a period of downtime when no electricity is being produced. Hence, an extended core life is extremely advantageous and desirable.

The benefits of an extended core life in the prior art is not fully attained because of incomplete fuel consumption in the axial and radial directions during the life of the core. The incomplete consumption of fuel is most prevalant at the top and the bottom of the core. Attempts have been made to alleviate this poor utilization of fissile material inventory by employing natural uranium or, seed blankets, at the top and the bottom of the core. In theory, enriched uranium can be removed and replaced by the seed blankets of natural uranium. Thus, there would be a savings of enriched uranium in areas where there is incomplete burning and the natural uranium would produce plutonium which can thereafter be burned. The benefits of such attempts, however, have not been as successful as anticipated because the production of the plutonium in the natural uranium blankets cannot be utilized as well as desired at th.e ends of the core. Also, a significant and detrimental condition of axial power peaking increase occurred because the active core "looks" shorter with the relatively nonfissionable natural uranium at the core ends.

Another prior art attempt to alleviate the noncomplete fuel consumption at the ends of the core was to separate the core into two axial sections, a lower assembly and an upper assembly. After a specified period of reactor operation, for example, when the anticipated core life has been reduced by a predetermined percent, or the fuel is depleted by a predetermined amount, the lower and upper assemblies are interchanged causing the core ends to be turned toward the middle of the core. In this manner, it was anticipated that the non-burned core ends would then be relocated to a core region where full consumption would occur. While such attempts do enhance more full utilization of the fuel inventory, it also causes prohibitive axial power peaking. And, significant undesirable reactivity loss is experienced because of a fuel gap which occurs between the upper and lower core assemblies.

The disadvantages associated with the prior art attempts to alleviate the problem of incomplete fuel consumption at the core ends has resulted in the nonemployment of these designs in commercial nuclear power plants. Thus, there still exists a need for a design which: better utilizes the fuel at the core ends such that substantially full consumption of the fissile material in the core occurs at the end of core life; allows the use of axial blankets for plutonium production and burnup; allows the use of lower enriched fuel; and, provides axial power flattening.

Accordingly, a primary object of the present invention is to provide a high utilization fuel assembly which provides for full consumption of the fissile material over the entire length of the core.

Another primary object of the present invention is to provide a high utilization fuel assembly which provides for the use of axial uranium blankets and fissile material production at the core ends.

Another primary object of the present invention is to provide a high utilization fuel assembly which allows the use of lower enriched uranium without sacrificing extended core life.

Another primary object of the present invention is to provide a high utilization fuel assembly which provides for axial power flattening of an inverted, two section core.

Although not specifically listed above, there are other objects of the invention which will be apparent to those skilled in the art, which other objects are intended to be achieved by the present invention.

SUMMARY OF THE INVENTION

The above primary objects as well as others are achieved by the present invention which provides a high utilization fuel assembly having axially shifted fuel rods which are separated into lower and upper assemblies.

In its simplest embodiment there is only one type of fuel rod which includes a length of enriched uranium and a length of fission gas plenum. Two of such fuel rods are axially aligned with a small axial space or gap therebetween and positioned within each grid space of a standard fuel assembly grid. Each axial set of two fuel rods are axially offset relative to each adjacent set of two fuel rods in order to intermesh the innermost ends of the fuel rods within the fuel assembly. In this manner, the gap between the sets of fuel rods are also intermeshed. After a specific period of reactor operation, the lower and upper fuel rods are interchanged and each set of two fuel rods are axially shifted to a position opposite to their previously shifted axial position.

In another embodiment, two types of fuel rods are axially aligned within each grid position. As in the previous embodiment, each set of two rods are axially offset relative to the adjacent set of two fuel rods. In this embodiment, one fuel rod comprises a length of enriched fuel and a length of fission gas plenum while the other axially aligned rod comprises a length of enriched fuel, a length of lower enriched fuel and a length of fission gas plenum. Initially, the lengths of lower enriched fuel and the lengths of fission gas plenum are located at the axial center of the core. After a period of reactor operation, the rods are interchanged to locate the lower enriched lengths and the fission gas plenum lengths at the core ends, and the rods are again axially shifted relative to their initial axial offset.

In yet another embodiment, a seed blanket of natural uranium is included with the second above-stated embodiment such that production of and subsequent fissioning of plutonium is effectuated to even better utilize the fuel inventory in the core. The seed blanket of natural uranium may also be combined with the axially offset fuel rods containing only the enriched uranium and a fission gas plenum to create another embodiment.

Various other objects, advantages and features of the invention will become apparent to those skilled in the art from the following discussion taken in conjunction with the following drawings, in which:

BRIEF DESCRIPTION OF THE DRAWINGS

FIG. 3 is a schematic view of the details and arrangement of one embodiment of the invention using one type of fuel rod at the beginning of core life and the method of rearranging the fuel rods after a period of reactor operation.

FIG. 4 is a schematic view of the details and arrangement of a second embodiment of the invention using two types of fuel rods at the beginning of core life and the method of rearranging the fuel rods after a period of reactor operation; and, FIG. 5 is a schematic view of the details and arrangement of a third embodiment of using two other types of fuel rods at the beginning of core life and the method of rearranging the fuel rods after a period of operation.

DESCRIPTION OF THE PREFERRED EMBODIMENTS

Figure 1:
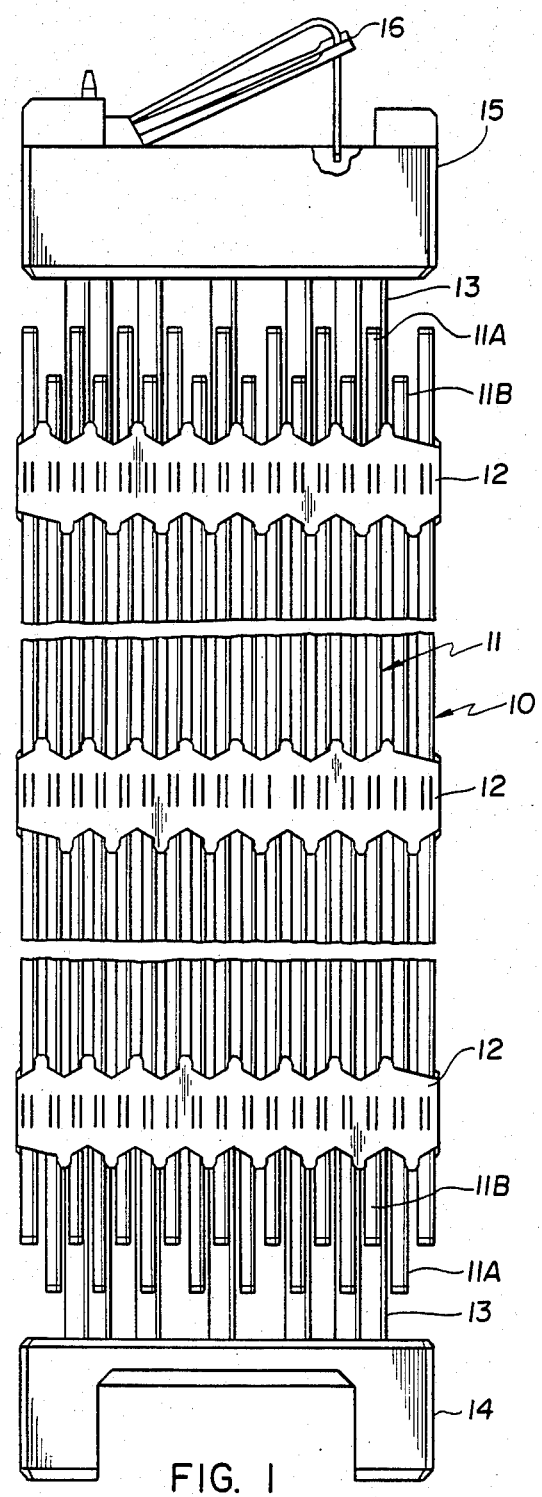
FIG. 1 is a plan view of a typical fuel assembly incorporating the present invention.
Figure 2:
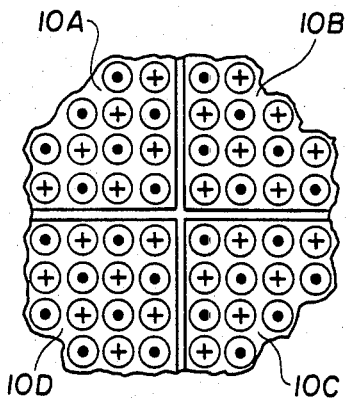
FIG. 2 is a schematic partial plan view of four adjacent fuel assemblies illustrating the shifted arrangement of adjacent fuel rods.

Referring now to the drawings, where like features and characteristics are denoted by the same reference numerals, FIG. 1 depicts a typical fuel assembly 10 incorporating the present invention for use in a pressurized light water nuclear reactor. As is well known in the art, an array of parallel arranged fuel rods 11 are separated from each other and structurally supported by a plurality of grids 12 which are axially spaced from each other along the length of the fuel assembly 10. An array of hollow guide tubes 13 are interspersed among fuel rods 11 (in predetermined locations) and structurally attached to grids 12 in a conventional manner. Guide tubes 13 provide for the insertion of reciprocally movable control rods (not shown) within the fuel assembly 10 to control the fission process and/or for the insertion of movable absorber rods (not shown) to absorb excess reactivity. Inlet 14 and outlet 15 nozzles are attached to guide tubes 13 at the reactor coolant flow inlet and outlet ends, respectively, of fuel assembly 10. Fuel assembly 10 fits in typical fashion between upper and lower core support plates which are not shown. Spring assembly 16 attached to outlet nozzle is adapted to be compressed when the upper core support plate (not shown) is placed in position within the pressure vessel (not shown) which houses the nuclear core made up of a plurality of side-by-side stacked fuel assemblies 10. Fuel assembly 10 as shown comprises a square 17×17 array of fuel rod assemblies; however, any other square array of fuel rod assemblies 11 may be used. It is to be noted, however, that each fuel rod assembly 11 is axially shifted relative to the fuel rod assembly 11 immediately adjacent thereto. The shifted arrangement exists side-to-side and front-to-back within fuel assembly 10 and continues between adjacent fuel assemblies 10A, 10B, 10C and 10D as shown in FIG. 2. FIG. 1 only shows the side-to-side shifted arrangement of the fuel rod assemblies 11 for purposes of clarity.

Each fuel rod assembly 11, as shown schematically in FIGS. 3, 4 and 5 comprises fuel rods 11A, 11A and 11B, and 11A and 11C, respectively, each of which comprise hollow metal tubes 20 having end plugs 21 sealingly connected thereto in a conventional manner. Two each of fuel rods 11A, or 11A and 11B, or 11A and 11C are axially aligned with each other throughout each fuel assembly 10 and occupy one grid space within grids 12. By way of comparison, the combination of two axially aligned fuel rods 11A, or 11A and 11B, or 11A and 11C, in the embodiments described herein, take the place of a single fuel rod in the fuel assemblies of the prior art. Thus, fuel rods 11A and 11B, and 11C are each approximately one half of the length of a prior art fuel rod.

FIGS. 3, 4 and 5 schematically show the axially shifted or offset relationship of any two immediately adjacent fuel rod 11 locations X and Y within fuel assembly 10, and hence, within the nuclear core. Only two fuel rod assemblies 11 are shown at each typical core location for purposes of clarity. FIGS. 3, 4 and 5 further schematically show the details and arrangement of fuel rod assemblies 11 at adjacent core positions X and Y during the initial stage of reactor operation (beginning of core life); and, the rearrangement of the same fuel rod assemblies 11 at the same core positions but after a predetermined period of reactor operation. For purposes of orientation, reactor coolant inlet 14 and outlet 15 nozzles are shown in phantom in FIGS. 3, 4 and 5. It is to be clearly understood, however, that positions X and Y do not necessarily comprise either end or outside positions within a fuel assembly 10; but, rather as stated above, any two immediately adjacent fuel rod assembly 11 positions within the nuclear core. FIG. 1 represents the arrangement Of the embodiment of FIG. 4 during the initial stage of reactor operation in that fuel rods 11A and 11B are denoted by their appropriate reference characters. Hence, to represent the embodiments of FIGS. 3 and 5 at the beginning of core life, it is only required to substitute the reference characters 11A and 11C, respectively, for 11B in FIG. 1.

Referring again to FIG. 3, fuel rods. 11A comprise a first section 22 of uniformly enriched fissile nuclear fuel such as uranium 235 or plutonium 239 and a second section comprising a plenum void 23. The enriched fuel 22 may be in the conventional form of stacked pellets (not shown) within tube 20; while the plenum void 23 may be fitted with a spring (not shown) bearing at one end against end plug 21 and its other end against the enriched fuel 22, as is well known in the art.

Since all of the fuel rods 11A in the embodiment of FIG. 3 are the same throughout fuel assembly 10, it is their shifted orientation and relationship at the beginning of life and their shifted orientation and rearrangement after a period of operation which is pertinent to the invention. As previously stated, typical fuel rod positions X and Y in FIG. 3 represent the beginning of core life of any two adjacent fuel rod assemblies 11; while positions X' and Y' represent the same fuel rod locations after a period of reactor operation. Fuel rods 11A at position X are arranged with the plenum void sections 23 axially adjacent to each other but separated by gap 24 and end plugs 21. Similarly, fuel rods 11A at position Y are also arranged with the plenum void sections 23 axially adjacent to each other but separated by gap 24 and end plugs 21. Thus, the gaps between fuel rods 11 at positions X and Y may be of the same axial length. All of the plenum void sections 23 at beginning of life are thus positioned in close approximation to the core midplane which is denoted by the line 25. Fuel rods 11A at position X are axially shifted upward relative to the core midplane 25 while the fuel rods at position Y are axially shifted downward relative to the core midplane 25 such that there is no axial overlapping of the plenum voids 23 between positions X and Y. In this manner, there is always some amount of enriched fuel at any core plane. The relative amount of axial shift 26 between positions X and Y is, therefore, substantially equal to the length of two plenum voids 23, plus the length of two end plugs 21, plus the length of one gap 24. The location of voids (due to plenum 23 and gaps 24) at the center of the core results in a high hydrogen to uranium (H/U) ratio resulting in increased fissioning of enriched fuel sections 27 (compared to fissioning of the same core sections in the prior art fuel rods) located laterally adjacent to the plenum voids 23 and gap 24 with substantially no increase in power peaking at the core center. Also, the axial offset 26 at positions X and Y produces a high H/U ratio at the core ends (due to the increased amount of reactor coolant and a lesser amount of uranium at axial offset 26) which also results in increased fissioning of the enriched fuel sections 28 laterally adjacent to offsets 26.

After a predetermined period of reactor operation, fuel rods 11A are shifted and rearranged as shown in FIG. 3 at positions X' and Y'. Upper fuel rod 11A at position X is relocated to lower fuel rod 11A at position X'; lower fuel rod 11A at position X is relocated to upper fuel rod 11A at position X'; upper fuel rod 11A at position Y is relocated to lower fuel rod 11A at position Y'; and, lower fuel rod 11A at position Y is relocated to upper fuel rod at position Y'. In this manner, the plenum voids 23 are relocated to the core ends; and, the fuel rods 11A at position X are shifted axially downward, while the fuel rods at position Y are shifted axially upward as shown at positions X' and Y', respectively. The shift of the axial offset relocates partially depleted enriched uranium sections 29 and more particularly, depleted enriched uranium sections 27 to the ends of the core. This axial shift results in higher H/U ratios over the length of sections 27 and 29 at the upper and lower ends of the core as shown in FIG. 3 at positions X' and Y'. The higher H/U ratios again results in increased fissioning of the fuel in these lengths which are now at the ends of the core. It is to be observed that gaps 24 at the center of the core are also offset relative to each other so that the upper and lower sections of the core created by the two part fuel rod assemblies 11 are intermeshed with each other thereby eliminating the detrimental axial gap across the core of the prior art two section cores. The rearranged fuel rods 11A at positions X' and Y' of FIG. 3 again provides for axial power flattening, enhances the utilization of fissile fuel inventory over the length of fuel rods 11A, and places the plenum lengths 23 at the core ends where the cooler environment reduces internal pressure within rod 20 in the last fuel cycle.

The embodiment shown in FIG. 4 is essentially the same as that shown in FIG. 3 with the addition of a length 31 of lesser enriched fuel in one of the two fuel rods comprising the fuel rod assembly 11. In this embodiment, fuel rod assemblies 11 each comprise a fuel rod 11A axially aligned with a fuel rod 11B. Fuel rod 11B is different from fuel rod 11A only in that section 31, having a length substantially equal to the length of two plenum voids 23, plus two end plugs 21, and plus one gap 24, contains fuel having a lesser enrichment than the remaining length of fuel in fuel rod 11B. Fuel rod assembly 11 at position Y is again axially offset downward relative to the fuel rod assembly 11 at position X in FIG. 4. In this embodiment, the lesser enriched lengths 31 are laterally adjacent to the plenum voids 23, end plugs 21, and gap 24 of the adjacent fuel rod assemblies 11. It is to be noted that the ends of lengths 31 at the centermost plane of the core represented by line 25 substantially coincide with each other. In this manner, at the beginning of core life, the center portion of the core is provided with lengths 31 of lesser enriched fuel and laterally coinciding lengths of voids (due to plenums 23 and gaps 24). The voids create high H/U ratios which drive the lesser enriched lengths 31 to higher burnups such that there is no sacrifice in the extended life of the core nor a loss or power while allowing the use of a lesser amount of enriched fuel. Also, the offset ends of the fuel rods 11A at the ends of the core are driven to higher burnups because of the higher H/U ratios at the core ends.

After a specified period of reactor operation, and/or fuel depletion, fuel rods 11A and 11B are rearranged and axially shifted as in the previous embodiment. The rearrangement and axial shift are shown schematically in FIG. 4 at positions X' and Y'. The sections 29 of fuel rods 11A now offset at the core ends are the sections that previously were in the region of the center of the core. And, the lengths 31 of lesser enriched fuel of fuel rods 11B are at the core ends but inward of lengths 29 of fuel rods 11A. The ends of fuel rods 11A and 11B which previously were at the core ends are now in the center of the core.

Still referring to positions X' and Y' of FIG. 4, the higher H/U ratios at the core ends, due to the axial offset 26, now increases the fissioning of sections 29 of fuel rods 11A again resulting in better utilization of the fuel at the core ends and a flattening of the axial power distribution. Then too, there are created other regions of higher H/U ratios which are along lengths 31 because of the lower enrichment and the higher burnup of lengths 31. The higher H/U ratio at lengths 31 is not, however, as high as the even higher H/U ratio at the axial offsets 26. Still, the fissioning of the enriched fuel laterally adjacent to lengths 31 and the lengths 31 are increased which further results in better utilization of the fuel at these locations and flattening of the axial power.

It is to be realized that the common aspects that the embodiment of FIG. 4 shares with the embodiment of FIG. 3, and although not specifically mentioned in the embodiment of FIG. 4, result in the same advantages stated for the embodiment of FIG. 3.

FIG. 5 represents a further embodiment of the present invention which is similar to the embodiment of FIG. 4 with the addition of a length 32 of natural uranium to one of the two fuel rods 11C comprising the fuel rod assembly 11.

Referring now to FIG. 5, it is to be observed at positions X and Y representing the beginning of core life that fuel rods 11A are again positioned as in the previous embodiments and that fuel rods 11C are positioned as were the fuel rods 11B of the prior embodiment. It is to be further observed that at positions X' and Y' representing the rearrangement and offsetting of fuel rods 11A and 11C after a specified period of reactor operation that the rearrangement and offsetting are as per the previous embodiment shown in FIG. 4. The difference between the embodiments of FIGS. 4 and 5 is that a length 32 of natural uranium has been included in fuel rods 11C at the end of the rod remote from the end containing the plenum void 23.

At the beginning of core life, fuel rods 11C are shifted in relative to fuel rods 11A. The natural uranium lengths 32 in fuel rods 11C at the upper and lower ends of the core provide for the production of fissionable plutonium. Plutonium production is enhanced over the seed blankets of the prior art since in the arrangement provided only every other rod in the upper and lower sections of the core comprises fuel rods 11C, which are the only rods which contain natural uranium, and therefore the neutron flux can be sustained at moderate levels at each end of the core. Further, the axial power peaking problem associated with the natural uranium seed blankets of the prior art is alleviated by virtue of the better dispersal of the natural uranium sections 32 among the fuel lattice and the higher H/U ratio areas of the core at its ends outward from the natural uranium lengths 32.

As with the previous embodiments, after a specified period of reactor operation, fuel rods 11A and 11C are rearranged and axially shifted as shown in positions X' and Y' of FIG. 5. The natural uranium lengths 32 are, therefore, relocated to the core center and intermeshed relative to each other. This rearrangement allows the plutonium produced in the first cycle to be fissioned and driven by the laterally adjacent low burnup fuel to produce power which in the prior art was produced by enriched uranium.

It is to be realized that the common aspects that the embodiment of FIG. 5 shares with the embodiment of FIG. 4 and although not specifically mentioned in the embodiment of FIG. 5, result in the same advantages stated for the embodiment of FIG. 4. Therefore, the embodiment of FIG. 5 includes all of the advantages of the axial power; a further reduction in the amount of enriched uranium used in the core without sacrificing extended core life; and, plutonium production and burnup. However, it is to be further realized that the natural uranium sections 32 of the embodiment of FIG. 5 may be directly added to the embodiment of FIG. 3, i.e. without adding the lower enrichment sections 31 of the embodiment of FIG. 4 to result in yet another embodiment of the invention. It is to be even further realized that the lengths of the plenum voids 23, the lower enriched fuel sections 31, the natural uranium sections 32, and the gaps 24 are not critical to the invention; provided, however, that at any axial core position there is present some type of fissile fuel linking the upper core section to the lower core section.

While the invention has been described, disclosed, illustrated and shown in certain terms or certain embodiments or modifications which is has assumed in practice, the scope of the invention is not intended to be nor should it be deemed to be limited thereby and such other modifications or embodiments as may be reserved especially as they fall within the breadth and scope of the claims here appended.

I claim as my invention:

1. A nuclear fuel assembly comprising an array of parallel arranged guide tubes, an inlet nozzle attached to one end of said guide tubes, an outlet nozzle attached to the other end of said guide tubes, a plurality of grids having the openings therethrough attached to and spaced along the length of said guide tubes, and a plurality of parallel arranged fuel rod assemblies each having an upper end and a lower end, said fuel rod assemblies being fitted within said openings in said grids, said fuel rod assemblies being arranged axially offset relative to each adjacent fuel rod assembly and comprising an upper fuel rod and a lower axially aligned fuel rod with a gap therebetween, said gap between said fuel rods each being axially offset relative to each adjacent gap so as to eliminate an axial gap across the core.

2. The fuel assembly of claim 1, wherein each of said upper and lower fuel rods comprise an elongated tube having an end plug connected to each end thereof, a length of enriched nuclear fuel contained within said tube at one end of said tube and a plenum void length within said tube at the other end thereof.

3. The fuel assembly of claim 2, wherein said fuel rod assemblies are each arranged with said plenum voids axially adjacent to each other and separated by said gap between said fuel rods, said plenum voids and said gap of each fuel rod assembly being axially offset relative to the plenum voids and gap of each adjacent fuel rod assembly.

4. The fuel assembly of claim 2, wherein said fuel rod assemblies are each arranged with one of said plenum voids located at the upper end of said fuel rod assembly and the other of said plenum voids being located at the lower end of said fuel rod assembly, said plenum void at the upper end of each of said fuel rod assemblies being axially offset relative to the plenum void at the upper end of each adjacent fuel rod assembly, and said plenum void at the lower end of each of said fuel rod assemblies being axially offset relative to the plenum void at the lower end of each adjacent fuel rod assembly.

5. The fuel assembly of claim 3, wherein one of said two fuel rods comprising each fuel rod assembly comprises a length of lesser enriched nuclear fuel located between said plenum void and said enriched nuclear fuel lengths, said fuel rod assemblies being arranged such that each of said lesser enriched lengths of nuclear fuel is located laterally adjacent to said plenum voids and said gap of each adjacent fuel rod assembly.

6. The fuel assembly of claim 4, wherein one of said two fuel rods comprising each fuel rod assembly comprises a length of lesser enriched nuclear fuel between said plenum void and said enriched nuclear fuel length, said fuel rod assemblies being arranged such that each of said lesser enriched lengths of nuclear fuel is alternately located at the upper and lower end of each adjacent fuel rod assembly.

7. The fuel assembly of claim 3, wherein one of said two fuel rods comprising each fuel rod assembly comprises a length of natural uranium located at the end of said rod opposite said plenum void and between said end plug and said enriched nuclear fuel length, said fuel rod assemblies being arranged such that each of said lengths of natural uranium is alternately located at the upper and lower end of each adjacent fuel rod assembly.

8. The fuel assembly of claim 4, wherein one of said two fuel rods comprising each fuel rod assembly comprises a length of natural uranium located at the end of said rod opposite said plenum void and between said end plug and said enriched nuclear fuel length, said fuel rod assemblies being arranged such that each of said lengths of natural uranium is located at the approximate center of each fuel rod assembly and is intermeshed with and laterally adjacent to said length of natural uranium of each adjacent fuel rod assembly.

9. The fuel assembly of claim 3, wherein one of said two fuel rods comprising each fuel rod assembly comprises a length of lesser enriched nuclear fuel located between said plenum void and enriched nuclear fuel lengths, and a length of natural uranium located at the end of said rod opposite said plenum void and between said end plug and said enriched nuclear fuel length, said fuel rod assemblies being arranged such that each of said lesser enriched fuel lengths is located laterally adjacent to said plenum voids and said gap of each adjacent fuel rod assembly, and such that each of said lengths of natural uranium is alternately located at the upper and lower end of each adjacent fuel rod assembly.

10. The fuel assembly of claim 4, wherein one of said two fuel rods comprising each fuel rod assembly comprises a length of lesser enriched nuclear fuel located between said plenum void and enriched fuel lengths and a length of natural uranium located at the end of said rod opposite said plenum void and between said end plug and said enriched nuclear fuel length, said fuel rod assemblies being arranged such that each of said lesser enriched lengths of nuclear fuel is alternately located at the upper and lower end of each adjacent fuel rod assembly, and such that each of said lengths of natural uranium is located at the approximate center of each fuel rod assembly and is intermeshed with and laterally adjacent to said length of natural uranium of each adjacent fuel rod assembly.

11. In a fuel assembly of a core of a nuclear reactor comprising an array of parallel arranged fuel rod assemblies, with each fuel rod assembly comprising an upper and a lower axially aligned fuel rod with a gap therebetween, each fuel rod comprising a length of enriched nuclear fuel and a length of plenum void, the method of arranging the fuel rod assemblies comprising the steps of:

positioning the plenum void of one fuel rod axially adjacent to the plenum void of the other fuel rod of each fuel rod assembly leaving a gap therebetween;

axially offsetting each fuel rod assembly relative to each adjacent fuel rod assembly such that the plenum voids and gaps of one fuel rod assembly are axially offset relative to the plenum voids and gap of each adjacent fuel rod assembly so as to eliminate an axial gap across the core;

operating the reactor;

after a predetermined period of reactor operation, rearranging each fuel rod assembly by relocating the lower fuel rod to the position previously occupied by the upper fuel rod and relocating the upper fuel rod to the position previously occupied by the lower fuel rod; and, axially offsetting each fuel rod assembly opposite to the previously offset position.

12. In a fuel assembly of a core of a nuclear reactor, comprising one array of parallel arranged fuel rod assemblies, with each fuel rod assembly comprising an upper and a lower axially aligned fuel rod with a gap therebetween, one fuel rod comprising a length of enriched nuclear fuel and a length of plenum void, the other fuel rod comprising a length of plenum void, a length of lower enriched nuclear fuel, a length of enriched nuclear fuel, and a length of natural uranium, the method of arranging the fuel rod assemblies comprising the steps of:

positioning the fuel rod comprising the plenum void and the enriched fuel in the upper of the two fuel rod positions with the plenum void being positioned at the lowermost part thereof;

positioning the other fuel rod of the same fuel rod assembly relative to the first fuel rod such that the plenum voids of the two fuel rods are axially adjacent to each other; arranging each adjacent fuel rod assembly such that the fuel rod comprising the plenum void and the enriched fuel is positioned in the lower of the two fuel rod positions with the plenum void at the uppermost part thereof, and the other fuel rod of the same fuel rod assembly is positioned relative thereto such that the plenum voids of the two fuel rods are axially adjacent to each other;

axially offsetting each fuel rod assembly relative to each adjacent fuel rod assembly such that the plenum voids and the gap of one fuel rod assembly is axially offset relative to the plenum voids and gap of each adjacent fuel rod assembly;

operating the reactor;

after a predetermined period of reactor operation, rearranging each fuel rod assembly by relocating the lower fuel rod to the position previously occupied by the upper fuel rod and relocating the upper fuel rod to the position previously occupied by the lower fuel rod; and, axially offsetting each fuel rod assembly opposite to the previously offset position.

* * * * *